US00RE37093E

(19) United States
(12) Reissued Patent
Okamoto

(10) Patent Number: US RE37,093 E
(45) Date of Reissued Patent: Mar. 13, 2001

(54) OPTICAL DISK DRIVE UNIT WITH A SEALING TYPE BEARING MEMBER

(75) Inventor: Akihiko Okamoto, Kawasaki (JP)

(73) Assignee: Ricoh Company, Ltd., Tokyo (JP)

(21) Appl. No.: 08/866,380

(22) Filed: May 30, 1997

Related U.S. Patent Documents

Reissue of:
(64) Patent No.: 5,301,179
Issued: Apr. 5, 1994
Appl. No.: 08/890,539
Filed: May 28, 1992

U.S. Applications:
(63) Continuation of application No. 08/514,225, filed on Aug. 11, 1995, now abandoned.

(30) Foreign Application Priority Data

Jun. 3, 1991 (JP) ..... 3-157435

(51) Int. Cl.[7] ..... G11B 33/02
(52) U.S. Cl. ..... 369/77.2
(58) Field of Search ..... 369/77.2, 77.1; 360/99.06, 99.07, 99.02, 99.08

(56) References Cited

U.S. PATENT DOCUMENTS 4,636,781 * 1/1987 Wills et al. ..... 340/700
4,829,393 5/1989 Shimizu et al. ..... 360/71
5,060,101 10/1991 Isomura ..... 360/106
5,172,362 12/1992 Hattori et al. ..... 369/77.2
5,187,621 * 2/1993 Tacklind ..... 360/97.02
5,214,549 * 5/1993 Baker et al. ..... 360/97.02
5,477,401 * 12/1995 Squires et al. ..... 360/97.02

FOREIGN PATENT DOCUMENTS 3113792 5/1991 (JP) .

* cited by examiner

*Primary Examiner*—Allen T. Cao
(74) *Attorney, Agent, or Firm*—Cooper & Dunham LLP

(57) ABSTRACT

An optical disk drive unit comprising: a sealing enclosure which encloses from exterior the disk cartridge and an access mechanism for the recording medium in the disk cartridge; an input device for inputting an eject command signal; a pin for moving and arranging a cartridge eject device to a state for starting its function; a cam which is disengaged from the pin when the cartridge is unloaded and which is contacted from the pin to start the ejecting function when the cartridge is loaded so that by rotating the cam, the ejecting function can be conducted; a cam drive disposed outside of the enclosure; a linkage for connecting a shaft of the cam drive to the cam through a hole formed in the enclosure; and a controller for controlling the cam in such a way that upon receipt of the eject command signal from the input device, the cam drive is driven to rotate the cam until the cartridge is ejected, wherein through a hole 15 of the chassis 1 is inserted a shaft 81 of the cam 80, and a worm wheel 79 is connected to the shaft 81 through an engagement member 82, the worm wheel 79 engaging with a worm 77 installed on a rotational shaft of an eject motor 76.

21 Claims, 14 Drawing Sheets

OPTICAL DISK DRIVE UNIT WITH A SEALING TYPE BEARING MEMBER

Matter enclosed in heavy brackets [ ] appears in the original patent but forms no part of this reissue specification; matter printed in italics indicates the additions made by reissue.

*This is a continuation of application Ser. No. 08/514,225 filed Aug. 11, 1995, now abandoned, which is a re-issue application of Ser. No. 07/890,539 filed May 28, 1992, now U.S. Pat. No. 5,301,179.*

BACKGROUND OF THE INVENTION

1. Field of the Invention

The present invention relates to an optical disk drive unit having a mechanism for loading a disk cartridge which houses a disk-shaped recording medium on the device at a predetermined position thereof and ejecting the loaded disk cartridge from the device as well.

2. Description of the Related Art

An optical disk device uses an optical disk or a magneto-optic disk as a recording medium. The device uses the optical disk or magneto-optic disk (which is simply referred to as optical disk hereinafter) in a state wherein the optical disk is housed in a disk cartridge so that the optical disk can be conveniently exchanged.

Such a medium interchangeable optical disk device comprises a loading mechanism and an ejection mechanism for exchanging the disk cartridge, which forms many opening portions through which the inside of the device communicates with the outside of the device on the housing or chassis of the device so that the outer air is freely introduced into the device.

Accordingly, dusts or other particles included in the air stick to the optical parts assembled in the pickup device, which disturbs the wave-form of the optical signal, which lowers the reliability of the signal and causes the data error.

In order to prevent the outer air from entering into the optical disk device, it may be ideal to completely enclose the optical disk device.

However, in accordance with the ejection mechanism of the related art, to set the ejection mechanism as the initial state thereof, before the operation of the optical disk device, an eject pin has to be moved to a predetermined initial position by manually pressing an eject button, for instance. For this purpose, the chassis of the optical disk drive unit of the related art has a longitudinal opening formed therein corresponding to the moving range of the eject pin, which involves in the problem of entrance of outer air into the device through the opening.

Also, the movement of the eject pin along the longitudinal opening causes to generate dusts which are introduced into the device and attached to parts installed in the device.

SUMMARY OF THE INVENTION

The present invention was made considering the above mentioned problems of the related art. It is therefore an object of the present invention to provide an optical disk drive unit which is able to prevent the entrance of dusts into the optical disk device through the opening around the eject pin and avoid generation of dusts due to the movement of the eject pin.

The above mentioned object of the present invention can be achieved by an optical disk drive unit for loading a disk cartridge which houses a disk-shaped recording medium at a predetermined position in the unit and ejecting the loaded disk cartridge from the unit as well, the optical disk drive unit comprising:

a sealing enclosure which sealingly encloses the recording medium and an access mechanism for writing/reading data on and from the recording medium from exterior in a state where the disk cartridge is installed in the unit;

an input device for inputting a command signal to eject the loaded disk cartridge from the unit;

an eject device for ejecting the disk cartridge from the unit;

a pin for moving and arranging the eject device to a state for starting its ejecting function;

a cam member which is arranged in such a way that the cam member is in a state of being disengaged from the pin when the disk cartridge is being unloaded from the unit and that the cam member is in a state of being contacted from the pin to start the ejecting function by the eject device when the disk cartridge is being loaded in the unit so that by rotating the cam member, the ejecting function can be conducted;

a cam drive device for driving the cam member to rotate which drive device is disposed outside of the sealing enclosure;

a linkage device for connecting a rotational shaft of the cam drive device to the cam member which linkage device is disposed penetrating through a hole formed in the sealing enclosure; and a control device for controlling the cam member in such a way that upon receipt of the command signal to eject the disk cartridge transmitted from the input device, the cam drive device is driven to rotate the cam member until the disk cartridge is ejected.

An advantage of the present invention is that, due to the arrangement wherein the drive unit for driving the eject pin is disposed in the outside of the enclosure body, it becomes possible to prevent dusts from entering into the enclosure which dusts are generated from the drive mechanism.

Also, it is another advantage of the present invention that, due to the arrangement wherein the opening around the linkage member which links the cam member and the drive unit together is closed, it becomes possible to avoid entrance of dusts through the opening.

Further objects and advantages of the present invention will be apparent from the following description of the preferred embodiments of the invention as illustrated in the accompanying drawings.

BRIEF DESCRIPTION OF THE DRAWINGS

FIG. 2b is a partial perspective view of the disk cartridge of FIG. 2a;

FIG. 5b is a partial sectional view of the eject mechanism of FIG. 5a;

FIG. 14b is a schematic view showing a movement of the worm wheel 79 seen from the bottom thereof, in the eject mechanism of FIG. 14a;

FIG. 14c is another plane view of the male engagement member 82 used in the eject mechanism of FIG. 14a;

DESCRIPTION OF THE PREFERRED EMBODIMENTS

Embodiments of the present invention are described hereinafter in detail with reference to the drawings.

Figure 1A:
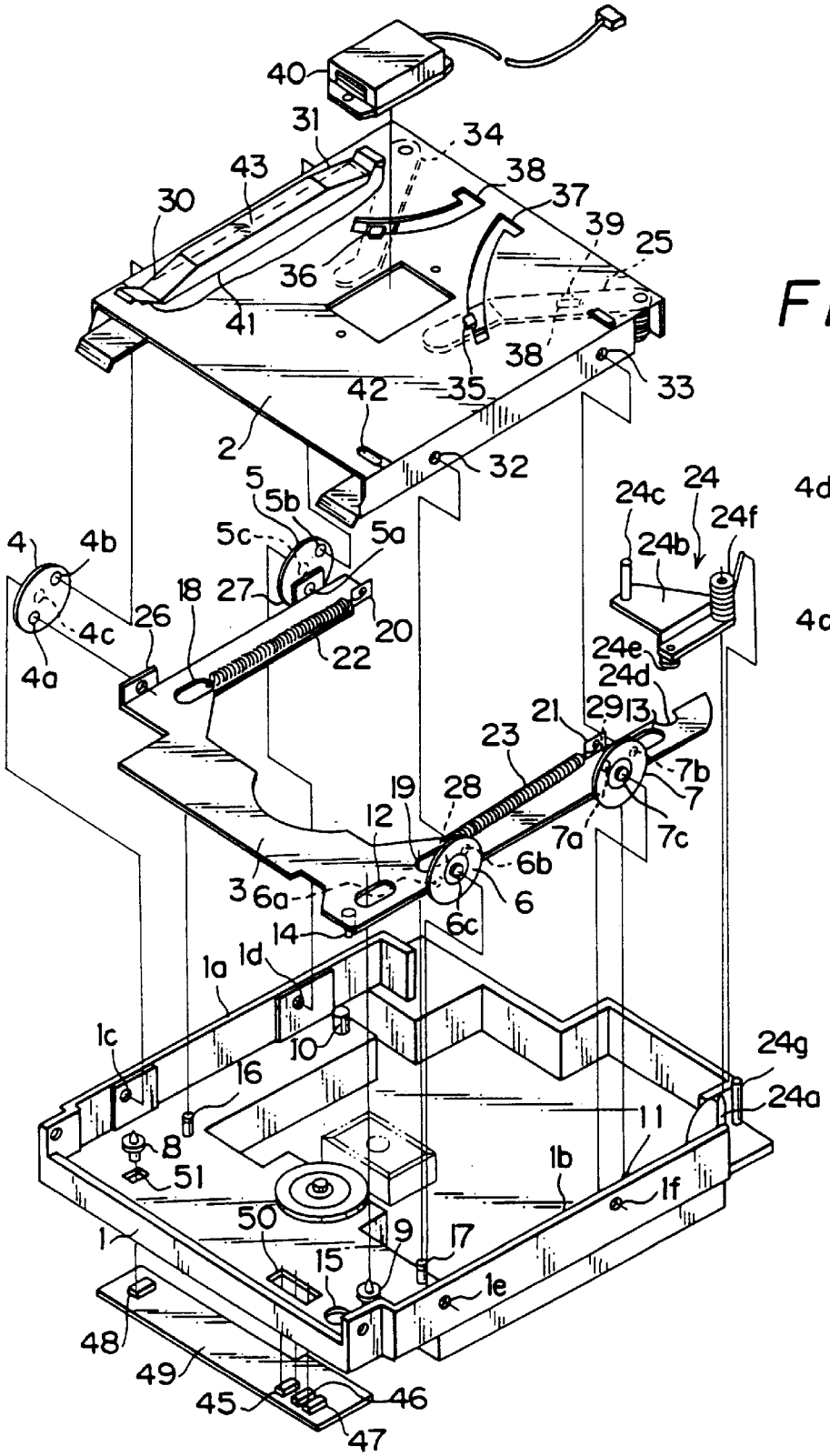
FIG. 1a is an exploded perspective view of the magneto-optic disk drive unit in accordance with an embodiment of the present invention.

FIG. 1a illustrates the magneto-optic disk drive unit in accordance with an embodiment of the present invention.

In the drawing, the magneto-optic disk drive unit comprises a chassis 1 on which is mounted a disk loading mechanism constituted from a tray 2 for housing a disk cartridge (described later), a carrier 3 which reciprocates in the directions of insertion and ejection for the disk cartridge, and cams 4, 5, 6 and 7 which links the tray 2 and the carrier 3 with each other so that the tray 2 is moved back and forth in the directions of insertion and ejection of the disk cartridge along with the movement of the carrier 3.

In the chassis 1, there are disposed leveling pins 8, 9, 10 and 11 for standardizing the height of the disk cartridge which is to be installed in the disk drive unit. The disk cartridge is inserted into the drive unit from the front side of the unit in the drawing. Two of the leveling pins 9 and 11 are disposed back and forth on the right side of the chassis 1 with respect to the cartridge insertion direction. The carrier 3 has longitudinal holes 12 and 13 formed therein along the insertion direction of the disk cartridge for guiding the pins 9 and 11 arranged on the chassis 1.

At a portion in front of the front side hole 12 of the carrier 3 is arranged an eject pin 14 disposed underside of the carrier 3 protruding downward therefrom. The eject pin 14 is arranged to push the carrier 3 in the operation of ejecting the disk cartridge. The chassis 1 has a hole 15 formed therein through which an eject mechanism (described later) for driving the eject pin 14 is arranged to pass.

Pins 16 and 17 are disposed behind the leveling pins 8 and 9, respectively. The carrier 3 has longitudinal holes 18 and 19 formed therein through which the pins 16 and 17 of the chassis 1 are guided and escaped, respectively, so that the pins 16 and 17 protrude through the holes 18 and 19, respectively, toward the upper side of the carrier 3. Hooks 20 and 21 are arranged in the rear side portion of the carrier 3. Springs 22 and 23 which bias the carrier 3 to move toward the cartridge ejecting direction are disposed spanning between each of the hooks 20, 21 and each of the pins 16, 17 protruding through the holes 18, 19, respectively.

When the disk cartridge is not installed in the carrier 3, the bias force from the springs 22 and 23 is made unenforceable on the carrier 3 due to the arrangement of a latch mechanism 24 which is disposed behind the hole 13 of the carrier 3 and prevents the carrier from moving.

The latch mechanism 24 comprises an axle 24a arranged on the chassis 1, a latch plate 24b rotatably attached to the axle 24a, a latch pin 24c mounted on the latch plate 24b at a position where the pin 24c is able to engage with a lever 25 attached to the tray 2, a latch roller 24e which is arranged to engage with a recessed portion 24d formed in the carrier 3, and a latch spring 24f made from a coil spring biasing the latch plate 24b in the direction where the pin 24c comes in contact with the lever 25. An end of the spring 24f engages with an end of the plate 24b and the other end of the spring 24f engages with a pin 24g disposed adjacent to the axle 24a.

Along the both side edges of the carrier 3, at the front and rear end portions thereof, four vertically rising pieces 26, 27, 28 and 29 are formed. A cam 4, 5, 6, 7 is arranged corresponding to each of the pieces 26, 27, 28 and 29 in such a way that a functioning axle 4a, 5a, 6a, 7a of the cam 4, 5, 6, 7 is inserted into a through-hole formed in each piece 26, 27, 28, 29. The cam 4, 5, 6, 7 has another functioning axle 4b, 5b, 6b, 7b formed on the same side as the axle 4a, 5a, 6a, 7a. Each axle 4b, 5b, 6b, 7b is inserted into a through-hole 30, 31, 32, 33 formed in each of both side walls of the tray 2. It is to be noted that the holes 31 and 33 are desirably formed as an oval hole to absorb the unevenness of the assembling accuracy of the cam.

Figure 1B:
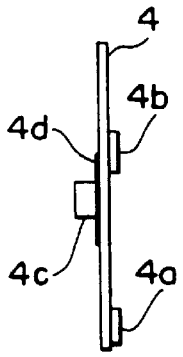
FIG. 1b is a sectional view of the cam which constitutes a disk loading mechanism of the present invention.

The cam 4, 5, 6, 7 has a pivot axle 4c, 5c, 6c, 7c formed on the other side of the functioning axle side, as illustrated in FIG. 1b which is representing only the cam 4 but the same as for the other cams 5, 6 and 7. The pivot axle 4c, 5c, 6c, 7c is inserted into each of through-holes 1c, 1d, 1e and 1f formed in side plates 1a and 1b vertically disposed along both of the right and left side edges of the chassis 1.

In accordance with the arrangement mentioned above, the cams 4, 5, 6 and 7 are rotatably attached to the chassis 1 and interconnect the tray 2 and carrier 3 as well. Also, due to this arrangement, the movement direction of the tray 2 is limited to the direction which is allowed by the cams 4, 5, 6 and 7.

Also, at the root portion of each pivot axle 4c, 5c, 6c, 7c of the cam 4, 5, 6, 7 is formed a hub 4d, 5d, 6d, 7d protruding from the cam disk surface, as illustrated in FIG. 1b, so as to decrease the contact area between the cam and the chassis aiming at reduction of the frictional force generated therebetween. Further, the cam 4, 5, 6, 7 is made from resin having a low frictional coefficient such as polyacetal so as to minimize the frictional force generated in the contact area between the cam and the chassis.

The tray 2 is formed in such a shape that the tray holds the disk cartridge from upper side and the both right and left sides thereof. Also, the tray 2 has a support rim member along each of the right and left side edges of the tray at the lower portion thereof. The inlet portion for the cartridge of the rim member of the tray 2 is cranked downward.

Inside of the tray 2, two levers 25 and 34 are rotatably arranged to open and close a shutter of the disk cartridge as described later. The levers 25 and 34 are biased outward. A guide pin or engaging hook 35, 36 is disposed on the upper surface of each of the levers 25 and 34. The guide pins (hooks) 35 and 36 are inserted in circular arc shaped guide slots 37 and 38 formed in the upper plate member of the tray 2, respectively, engaging with the rim of each slot opening. The hooks 35 and 36 are guided along the slots 37 and 38, respectively, whereby the movement directions of the levers 25 and 34 are limited. Also, the levers 25 and 34 are disposed at different levels so that they can move without interfering with each other.

In the lever 25 is formed a longitudinal hole 38 through which the latch pin 24c penetrates. Also, a cut away 39 is formed in the lever 25 opening the hole 38 out of the lever 25 so as to guide the latch pin 24c into and out of the hole 38.

On the upper surface of the tray 2 is mounted a magnetic head 40 for generating an auxiliary magnetic field within a movable range of the optical pickup. Also, inside of the tray 2, along the both right and left side edges of the tray 2, pressing strip members 41 and 42 are arranged to limit the height of the disk cartridge by pressing the cartridge from upper side thereof. The pressing members 41 and 42 are biased downward by leaf springs 43 and 44, respectively. Only one of the leaf springs 43 is illustrated in FIG. 1a.

Figure 2A:
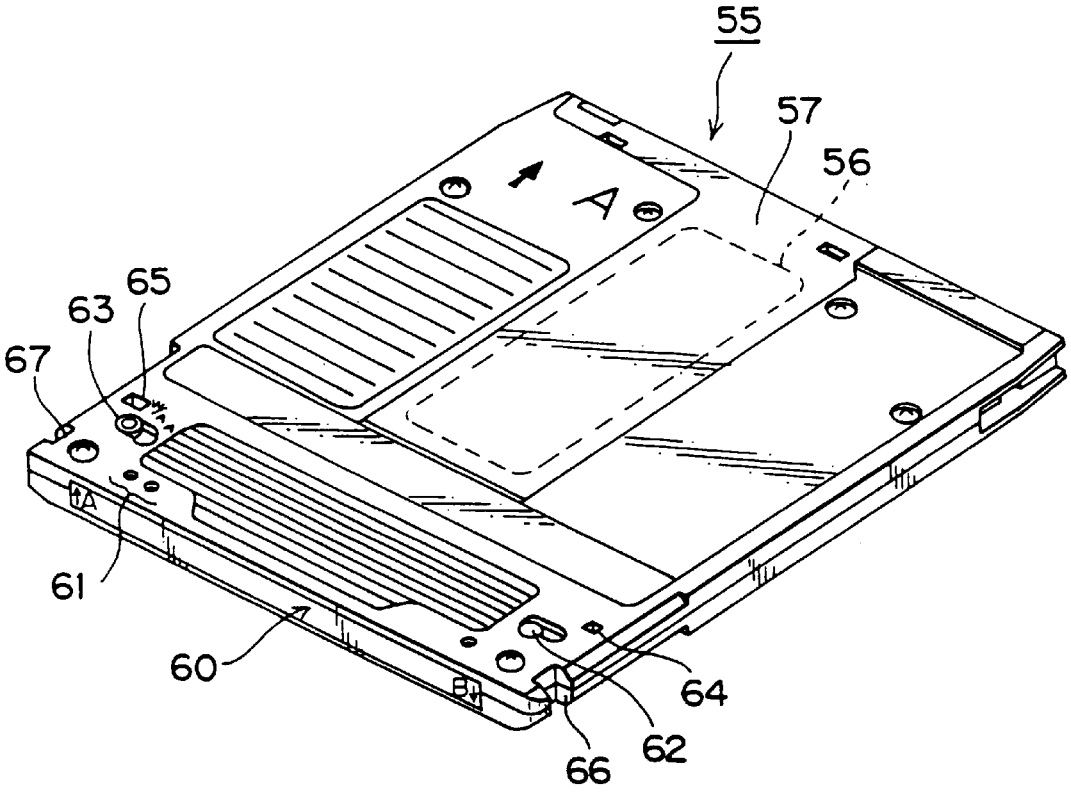
FIG. 2a is a perspective view of an example of the disk cartridge in accordance with the present invention.
Figure 2B:
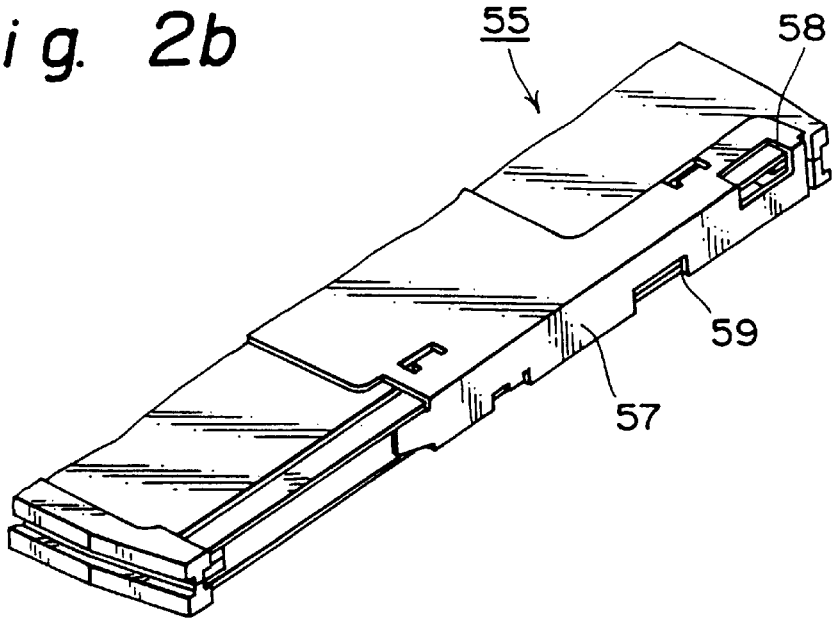

FIGS. 2a and 2b illustrate an example of the disk cartridge which is driven by the drive unit in accordance with the present invention.

As illustrated in FIG. 2a, in the center portion of the disk cartridge 55 is formed a rectangular access window 56 which is longitudinal in the insertion direction of the cartridge. The window 56 is opened and closed by a shutter 57. The shutter 57 is arranged as being folded from an edge portion 60 of the cartridge 55.

The shutter 57 arranged as mentioned above has openings 58 and 59 for receiving the above mentioned levers 25 and 34, respectively.

Figure 3:
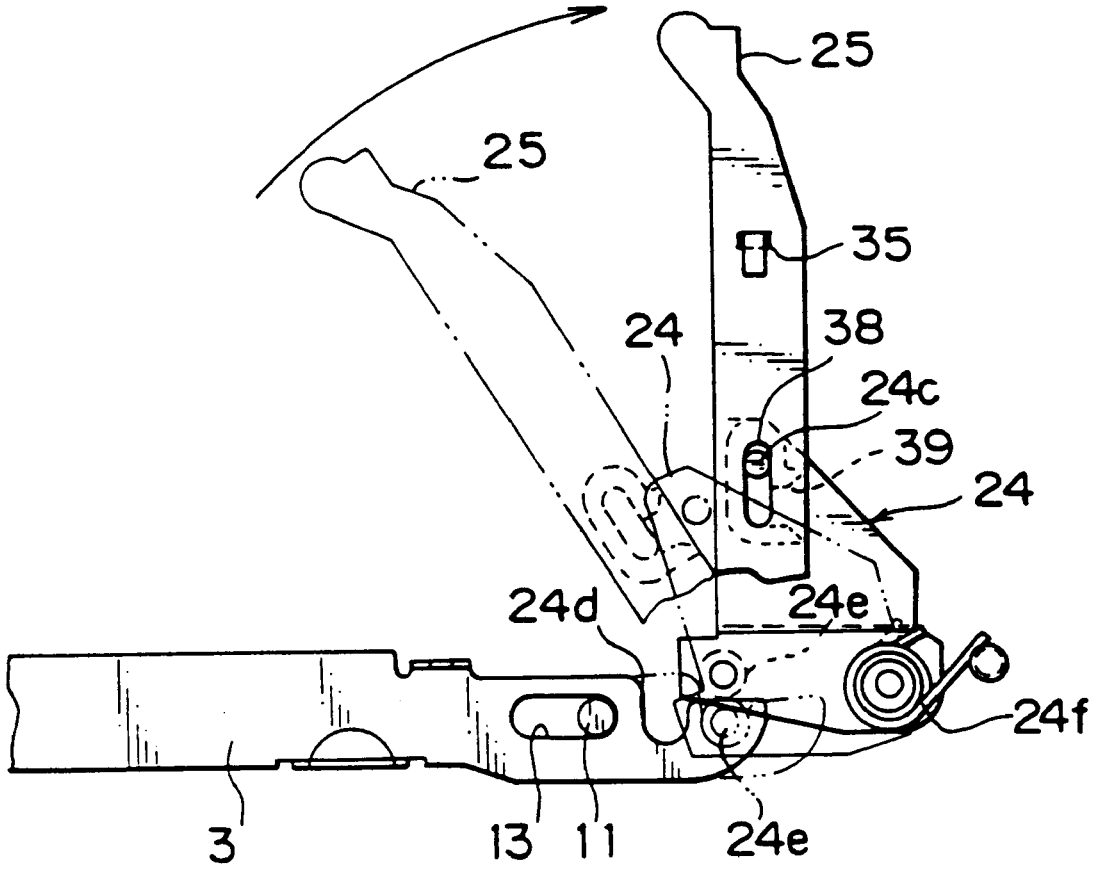
FIG. 3 is a plan view of the latch mechanism for explaining the function thereof.

In accordance with the above mentioned structure, in the event wherein the disk cartridge 55 is not housed in the tray 2, as illustrated by dash-two-dot lines in FIG. 3, the latch roller 24e of the latch mechanism 24 is being caught in the recess 24d of the carrier 3. Thereby, the eject springs 22 and 23 are made unenforceable to the carrier 3.

Also, in this state, the carrier 3 is waiting for insertion of the cartridge at the rearmost position with respect to the insertion direction. Therefore, as illustrated by solid lines in FIG. 4, the axles 4b, 5b, 6b and 7b of the cams 4, 5, 6 and 7 are being positioned at the uppermost level thereof. Accordingly, the insertion opening for the cartridge formed in the front side of the tray 2 comes to the same level as the insertion inlet 71 formed in the front panel 70 disposed in front of the chassis 1.

From this state, when the disk cartridge 55 is inserted into the tray 2, the levers 25 and 34 enter into the openings 58 and 59 of the shutter 57, respectively, so that the shutter 57 is gradually opened according to the insertion motion of the cartridge. On the middle of the insertion motion of the cartridge into the tray 2, the latch pin 24c enters into the oval hole 38 of the lever 25 through the cut away opening 39 formed continuous to the hole 38 of the lever 25. When the lever 25 is further moved according as the cartridge 55 is further inserted toward the rearmost side of the tray 2, the latch pin 24c is pushed by the lever 25 so that the latch plate 24b is rotated in the clockwise direction against the bias force of the latch spring 24f.

Due to this function, at the time when the lever 25 is moved to the rear end position so that the shutter 57 is completely opened, as illustrated by solid lines in FIG. 3, the latch pin 24c is moved to an end of the oval hole 38 and the latch roller 24e is disengaged from the recess 24d of the carrier 3. Therefore, the eject springs 22 and 23 act on the carrier 3 so that the carrier 3 is forced to move in the ejecting direction toward the front side of the unit. Also, in this state, the bias force which acts upon the levers 25 and 34 is made unenforceable on the levers due to the function of the latch mechanism 24.

Figure 4:
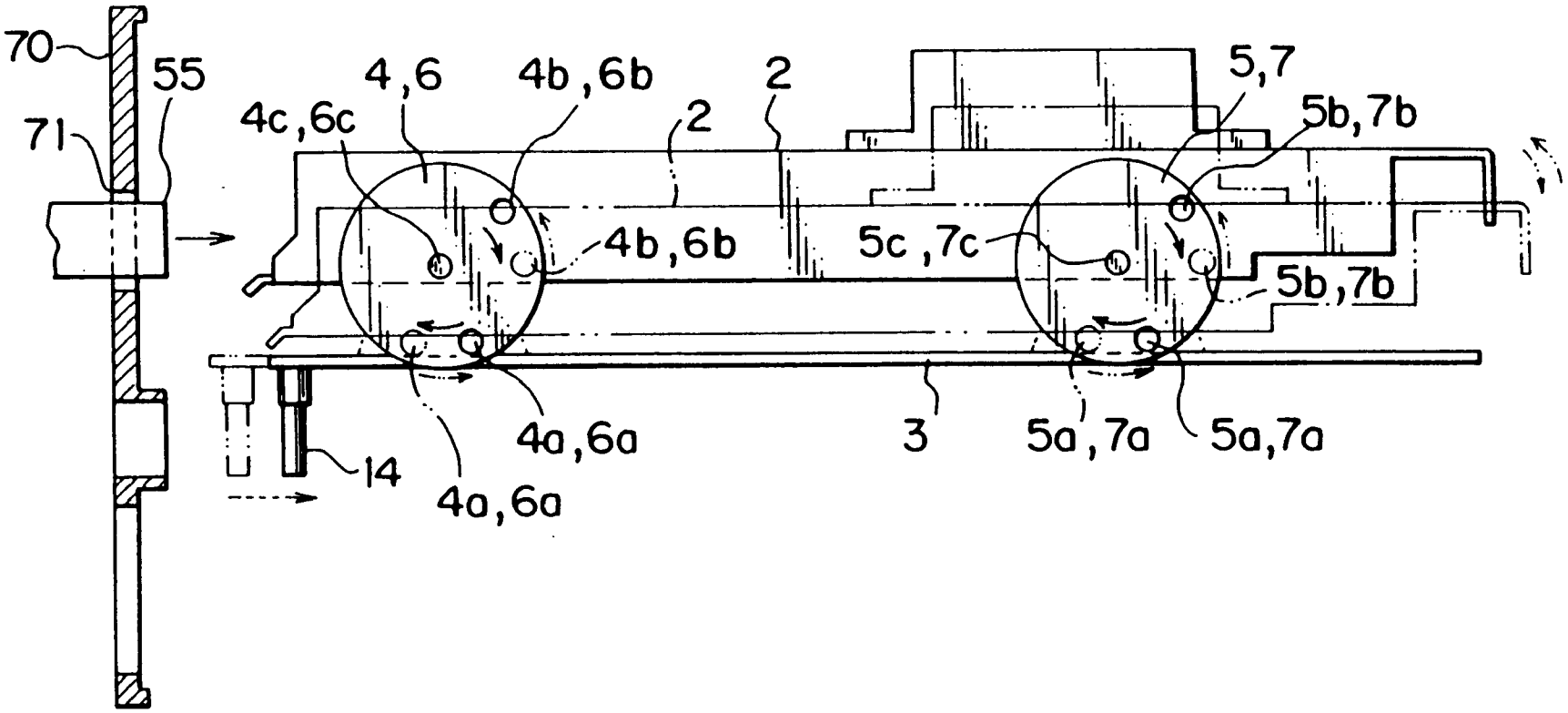
FIG. 4 is a side view of the carrier and tray combined together.

As a result of the series of function as mentioned above, as illustrated by dash-two-dot lines in FIG. 4, the cams 4, 5, 6 and 7 rotate in the clockwise directions since the axles 4a, 5a, 6a and 7a of the cams 4, 5, 6 and 7 are forced to move in the cartridge ejecting direction according as the carrier 3 moves.

As a result, the axles 4a, 5a, 6a and 7a of the cams 4, 5, 6 and 7 are moved lowermost position thereof so that the tray 2 descends to the position for loading the disk drive unit.

Also, in this state, the functioning surface of the magnetic head 40 is positioned in the vicinity of the recording surface of the magneto-optic disk (not shown) housed in the disk cartridge 55.

When the disk cartridge 55 is inserted in that way mentioned above, the carrier 3 is shifted in the ejecting direction toward front side of the unit and the tray 2 is moved arching downward along a circular arc so that the disk cartridge 55 is aligned with a predetermined position.

Next, the operation of ejecting the disk cartridge is described below.

When the disk cartridge 55 is to be ejected from the drive unit, the operator presses an eject button (described later) so that the eject pin 14 is moved in the cartridge insertion direction toward the rear side of the unit by the eject mechanism (described later) in cooperation with the eject button. Thereby, the carrier 3 is moved in the cartridge insertion direction against the force of the eject springs 22 and 23. According as the carrier 3 moves in the insertion direction, the cams 4, 5, 6 and 7 are rotated in the counterclockwise in FIG. 4 so that the tray 2 ascends gradually.

On the other hand, the latch plate 24b of the latch mechanism 24 is biased to rotate counterclockwise by the latch spring 24f. Therefore, when the carrier 3 moves and comes to the position where the recess 24d formed in the carrier 3 faces to the latch roller 24e, the roller 24e falls into the recess 24d.

At the same time when the roller 24e is caught into the recess 24d, the latch plate 24b is rotated so that the latch pin 24c pushes the lever 25 and that the pin 24c disengages from the oval hole 38 of the lever 25.

Accordingly, in the state wherein the tray 2 is moved to the uppermost position thereof, the levers 25 and 34 and the latch mechanism 24 apply force on the disk cartridge 55 so that the cartridge 55 is pushed out of the tray 2 and that a part of the cartridge 55 projects from the insertion inlet 71 formed in the front panel 70. Thereby it becomes possible to draw the cartridge 55 out of the tray 2.

As mentioned above, the carrier 3 reciprocates and simultaneously therewith the tray 2 moves upward or downward along the circular arc trail in accordance with the movement of the carrier 3 so that the cartridge 55 is loaded or unloaded.

Also, in accordance with this particular embodiment of the present invention mentioned above, tray 2 descends drawing the cartridge 55 toward the rear side of the unit, which makes it possible to install the cartridge 55 in the drive unit simply by pushing the cartridge 55 into the inlet 71. That is, it becomes unnecessary to push the cartridge 55 by a finger until the cartridge 55 comes to the rear end of the inside of the disk drive unit.

Figure 5A:
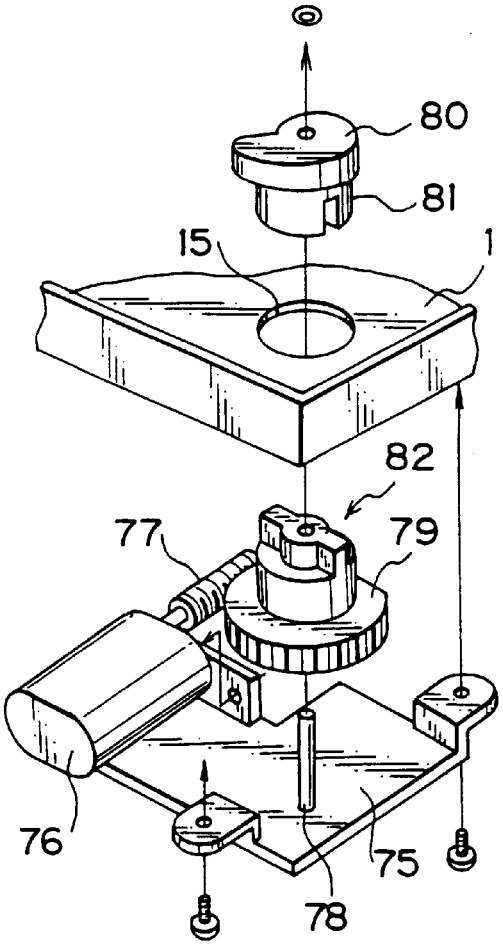
FIG. 5a is a partial exploded perspective view of an example of the eject mechanism in accordance with the present invention.
Figure 5B:
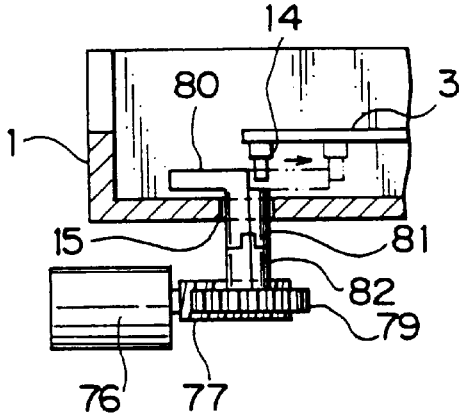

FIGS. 5a and 5b illustrate an example of the eject mechanism in accordance with the present invention.

In the drawings, the eject mechanism comprises a plate 75 on which an eject motor 76 is mounted. A worm 77 is installed on the output shaft of the motor 76. The worm 77 engages with a worm wheel 79 which is rotatably installed on a pin 78 mounted on the plate 75.

A male engagement member 82 is secured to the upper surface of the worm wheel 79 coaxially therewith and rotatable about the pin 78. The engagement member 82 engages with a female engagement member 81 which projects downward from the chassis 1 through a hole 15. The member 81 is formed as an integral structure with a cam 80 and rotates coaxially therewith. Also, the plate 75 is secured to the under side of the chassis 1 by means of screws.

In accordance with the structure mentioned above, when the eject motor 76 is driven to rotate, the rotational force thereof is transmitted to the cam 80 through the worm 77, worm wheel 79, and the engagement members 81 and 82 so that the cam 80 rotates in the same direction as the worm wheel 79.

Figure 14A:
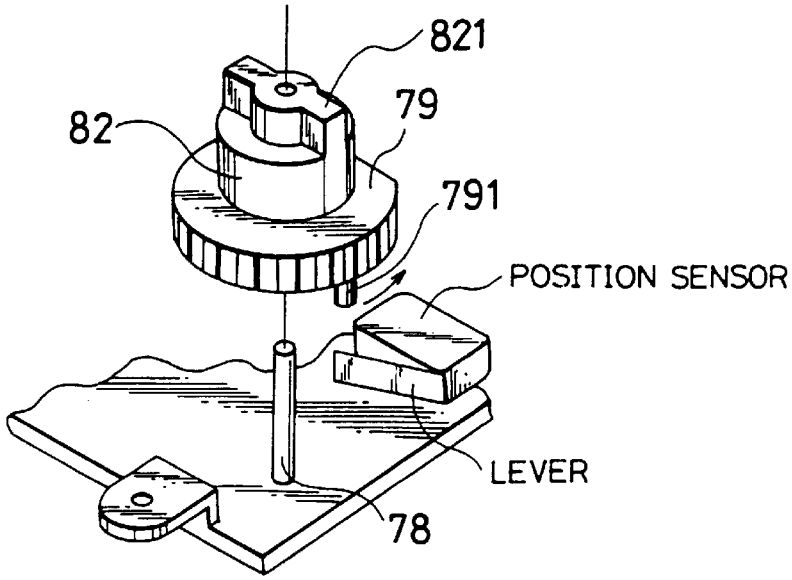
FIG. 14a is a partially expanded perspective view of another example of the eject mechanism in accordance with the present invention.
Figure 14B:
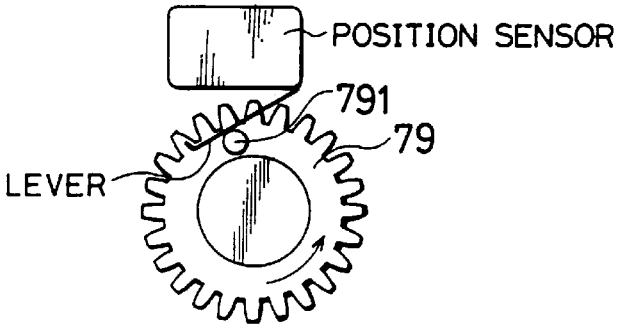
Figure 14C:
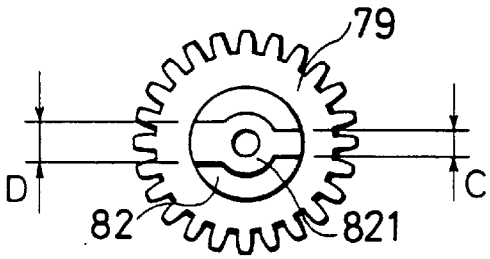

Next, in the FIGS. 14a and 14b, a protrusion 791 mounted on a lower portion of the worm wheel 79 pushes a lever of a switch to thereby stop the worm wheel 79 in a predetermined position. In this moment, the protrusion 791 and the cam 80 has a particular positional relationship therebetween. When the engagement member 81 of the cam 80 and the engagement member 82 are engaged with each other, they can be engaged in two directions. However, one of the two directions of the engagement will cause to disturb an operation of the eject pin 14. Therefore, as shown in FIG. 14c, in order to avoid such a disturbance, widths (C, D) of notches 821 of the engagement member 82 are made different from each other so that the cam 80 and the worm wheel 79 are engaged with each other only in a desired one direction.

Next, the function of the cam 80 is described with reference to FIGS. 6a to 6d below.

Figure 6A:
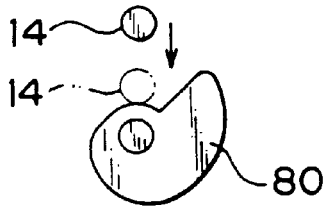
FIGS. 6a to 6d are explanatory views for explaining the function of the cam member in accordance with the present invention.

In a state wherein the disk cartridge 55 is not installed in the drive unit, as illustrated by the solid line in FIG. 6a, the eject pin 14 of the carrier 3 is positioned at the rearmost position in the anti-eject direction apart from the cam 80 as mentioned above. From this state, when the disk cartridge 55 is inserted, the carrier 3 is moved toward the front side of the unit as mentioned above so that the pin 14 also moves toward the front side of the unit and comes close to the cam 80. Finally, the pin 14 moves to the position where the pin abuts against the cam 80, as illustrated by dash line in FIG. 6a.

Figure 6B:
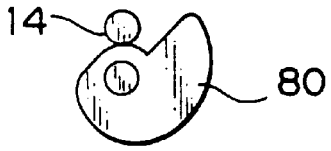
Figure 6C:
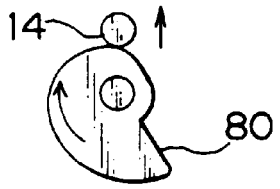
Figure 6D:
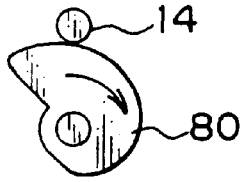

When the cartridge is to be ejected, according to the command signal to eject the cartridge, the motor 76 is driven to rotate so that the cam 80 is rotated clockwise from the state of FIG. 6b. Thereby, the pin 14 is gradually shifted toward the rear side of the unit along with the carrier 3 in accordance with the ejecting function thereof as mentioned above (FIGS. 6c and 6d).

Finally, immediately before the cam 80 is rotated for one turn when the pin 14 comes to the predetermined position in the cartridge ejecting direction, the disk cartridge is ejected from the unit as mentioned above.

When the cam 80 is rotated for one turn, the mechanism returns to the initial state.

As mentioned above, the cartridge ejecting operation can be achieved by rotating the cam 80 for one turn by the eject motor 76.

Also, in this case, the clearance or gap between the inside rim of the hole 15 and the engagement member 81 penetrating through the hole 15 is very small, so that almost no outer air can flow into the chassis of the unit through the gap formed around the engagement member 81 which constitutes the axle of the cam 80.

Figure 15:
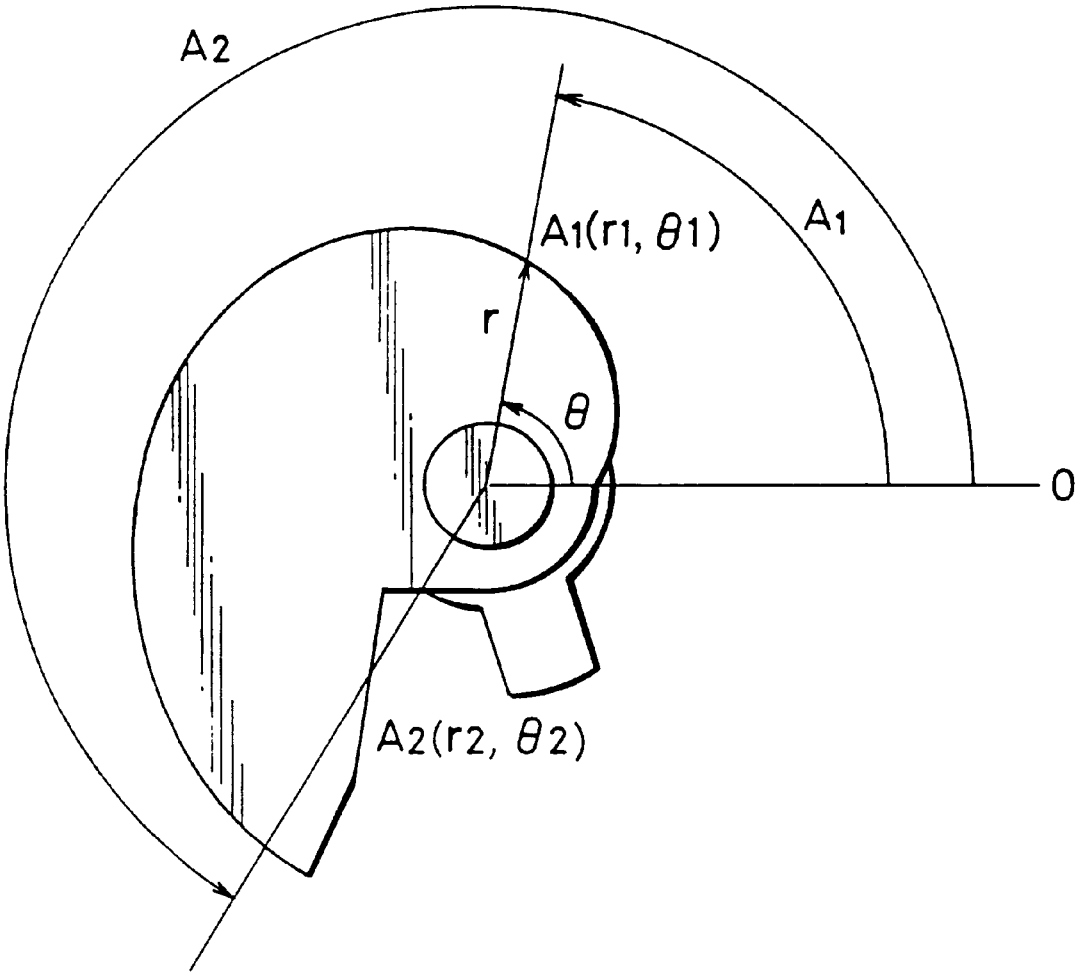
FIG. 15 is an explanatory view of the cam member used in the optical disk drive unit in accordance with the present invention, in which an increasing ratio of a radius to a rotary angle of the cam member is not constant.
Figure 16A:
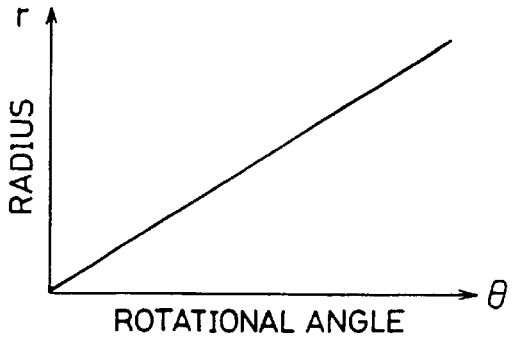
FIG. 16a is a graph showing a change of the radius value of the cam member 80, with respect to the rotary angle thereof.

In this case, the optical disk drive unit is provided with a cam 80 having such a shape that an increasing rate of a radius of a basic circle of the cam 80 with respect to a rotational angle thereof changes (FIG. 16c), while conventionally, the increasing ratio thereof is constant (FIG. 16a). Thereby, a load applied to the eject motor 76 is dispersed, and a life duration of the eject motor 76 can be prolonged. In concrete, as shown in FIG. 15, the relationship $\alpha>\beta$ is formed in which the radius increasing ratio between the angle 0 and the angle $A_1$ is $dr/d\theta=\alpha$, and that between the angle $A_1$ and the $A_2$ is $dr/d\theta=\beta$.

Figure 16B:
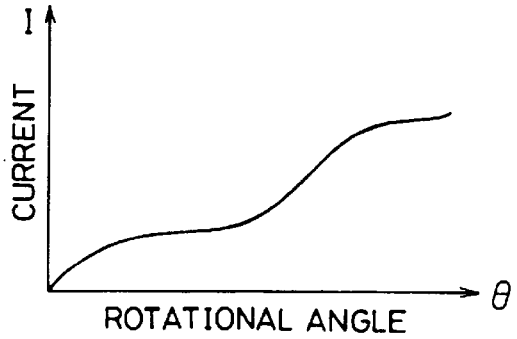
FIG. 16b is a graph showing a change of the current value flowing in a motor, with respect to the rotary angle of the cam member 80.
Figure 16C:
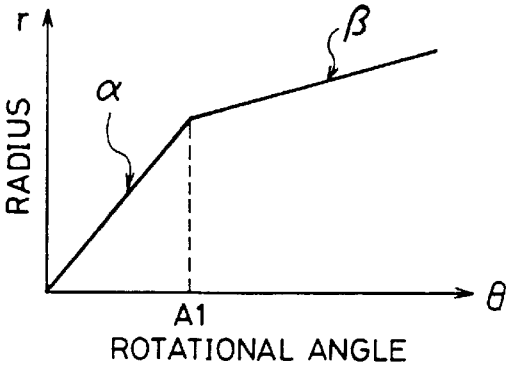
FIG. 16c is a graph showing a change of the radius value of the cam member 80 of FIG. 15, with respect to the rotary angle thereof.
Figure 16D:
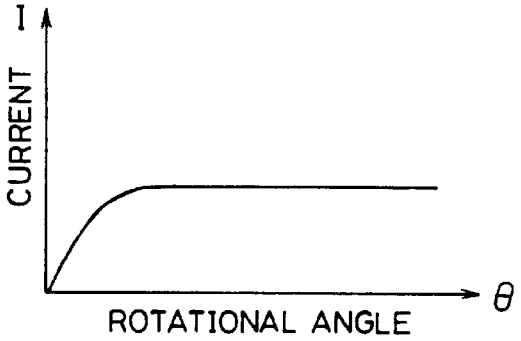
FIG. 16d is a graph showing a change of the current value flowing in the motor, with respect to the rotary angle of the cam member 80 of FIG. 15.
Figure 16E:
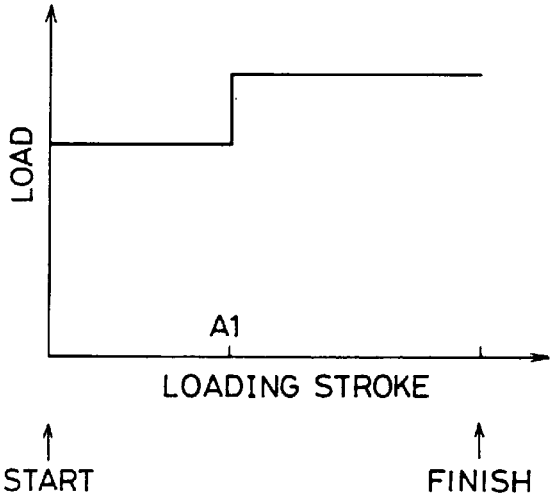
FIG. 16e is a view of an example for showing a change of the load of the simplified loading system with respect to a loading stroke.

The reason therefor is as below. A load of a loading, namely a force for enabling a pin 14 to move increases in the latter half of a moving distance of the pin until an ejection of the cartridge, in this loading system. Therefore, when the cam has such an outer configuration that the value of $dr/d\theta$ decreases in the latter half of the angular displacement of the cam, the load applied to the eject motor 76 can be uniformed, the load of the eject motor 76 can be decreased, and a time used for the ejection of the cartridge can be shortened (FIGS. 16b and 16d). This is because when an electric current flowing in the eject motor 76 is small, the load applied to the eject motor 76 decreases and therefore the life duration of the eject motor 76 is prolonged, FIG. 16e is a view of an example for showing a change of the load of the simplified loading system with respect to a loading stroke. The cam has such a configuration that the angular displacement amount to the point $A_1$ is large while that beyond the point $A_1$ is small.

Also, in accordance with the arrangement mentioned above, the transmission means for the eject mechanism is disposed outside of the chassis 1. Therefore, the dusts generated due to the engagement between the worm 77 and the worm wheel 79, for instance, can be prevented from entering into the chassis 1.

Figure 7:
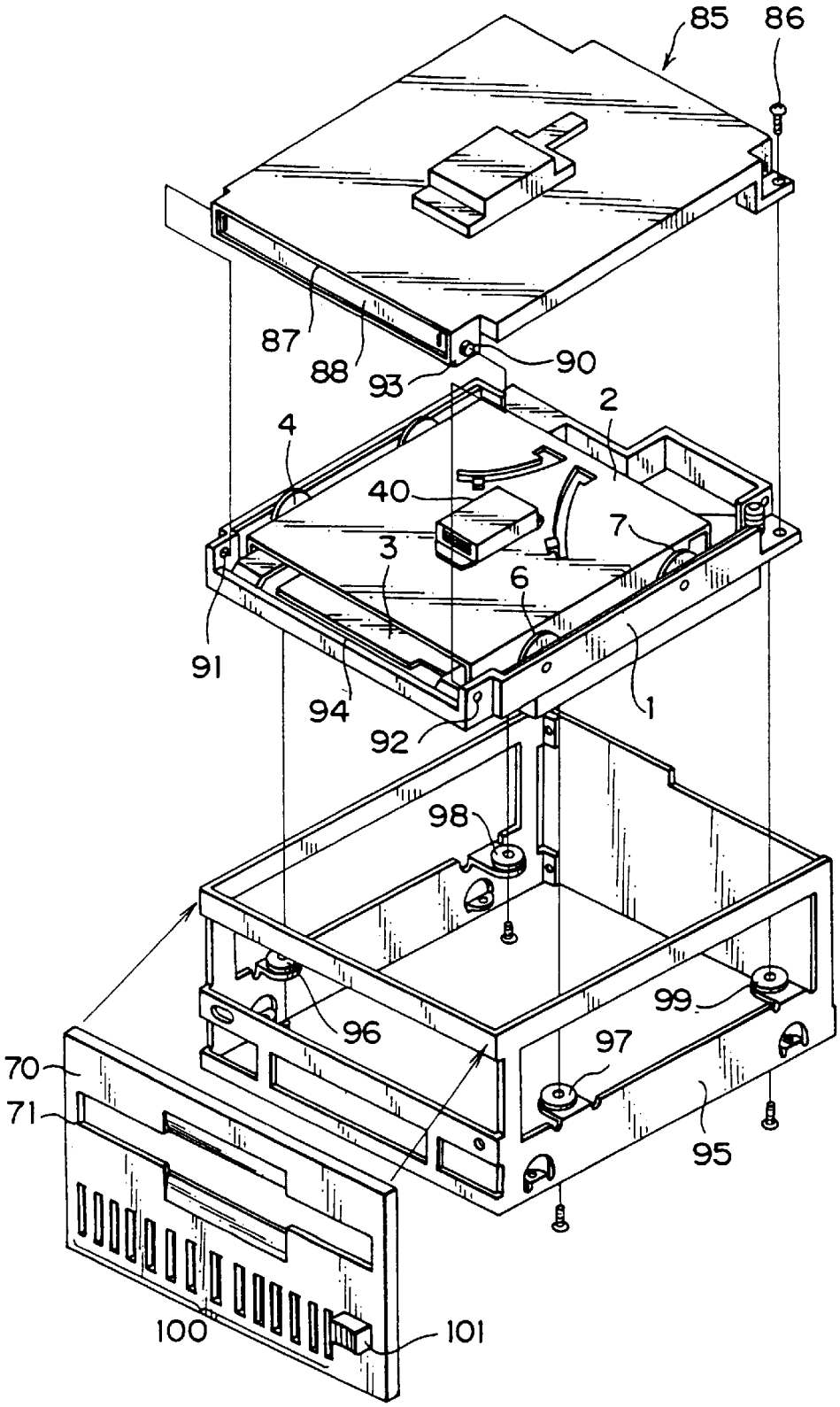
FIG. 7 is an exploded perspective view of an example of the enclosure hosing body structure in accordance with the present invention.

FIG. 7 illustrates an example of the sealing enclosure construction for housing the disk drive unit in accordance with an embodiment of the present invention.

In the drawing, a chassis cover 85 is depicted being formed in a shape wherein the lower rim portion of the cover 85 abuts against the upper rim portion of the chassis 1 and wherein the cover 85 is secured to the chassis 1 by a screw 86 at the rear end portion of the chassis 1. Also, in the front face of the chassis cover 85 is formed an insertion inlet 87 for receiving a disk cartridge which is to be inserted into the drive unit. An urged lid 88 for the inlet 87 is disposed inside the inlet 87 in a state of being biased to close the opening of the inlet and rotatable to open and close the inlet.

Small projections 89, 90 are formed in both side ends of the inlet member 87. Only one of the projections 90 is illustrated in FIG. 7. The projections 90 of the inlet member side fit into small holes 91 and 92 formed in both right and left ends of the front edge of the chassis 1. The width of the lid 88 disposed in front of the chassis 1 is the same as or slightly smaller than the outer size of the disk cartridge 55.

Also, the inlet 87 is formed in such a shape that the inlet surrounds the whole of the outer surface of the disk cartridge 55 and that the width of the inlet is slightly larger than the outer width of the disk cartridge 55 and height of the inlet is about the same as the thickness of the disk cartridge 55 so that the upper and lower surfaces of the disk cartridge 55 come in slight contact with the upper and lower members which constitute the inlet.

A recessed step 93 is formed under the inlet 87. A front wall 94 is arranged in the front side of the chassis 1. The vertical front side surface of the step 93 abuts against the vertical inner side surface of the front wall 94. The height of the front wall 94 is slightly shorter than the leveling pins 8, 9, 10 and 11 (FIG. 1).

Figure 8:
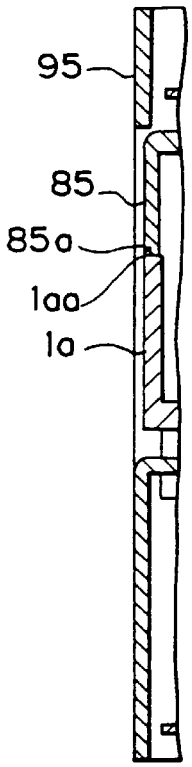
FIG. 8 is a schematic partial sectional view representing a state where the chassis and the chassis cover are combined together.

Also, each of the side plates 1a and 1b of the chassis 1 (FIG. 1) has a projecting step formed on its upper surface which step mates with a recessed step formed on the lower surface of each side plate of the chassis cover 85 so that the sealing tightness between the chassis and the cover is enhanced. This structure is illustrated in FIG. 8 which shows the side plate 1a of the chassis having the step 1aa projecting from the upper surface of the plate 1a formed in such a way that the step 1aa is received by and mates with the recessed step 85a formed in the lower surface of the side plate of the cover 85.

In accordance with the above mentioned way of arrangement, the chassis cover 85 is attached to the chassis 1 and the inlet 87 for insertion and ejection of the cartridge is closed by the lid 88 so that the inside of the chassis 1 is sealingly closed from outside.

Also, the chassis 1 is mounted on and secured to a frame 95 through pads or vibroisolating rubbers 96, 97, 98 and 99.

Also, a front panel 70 is attached to the front surface of the frame 95. Vent slots 100 for intaking outer air are formed in the lower portion of the panel 70. Also, an eject button 101 is arranged on the panel 70.

Figure 9:
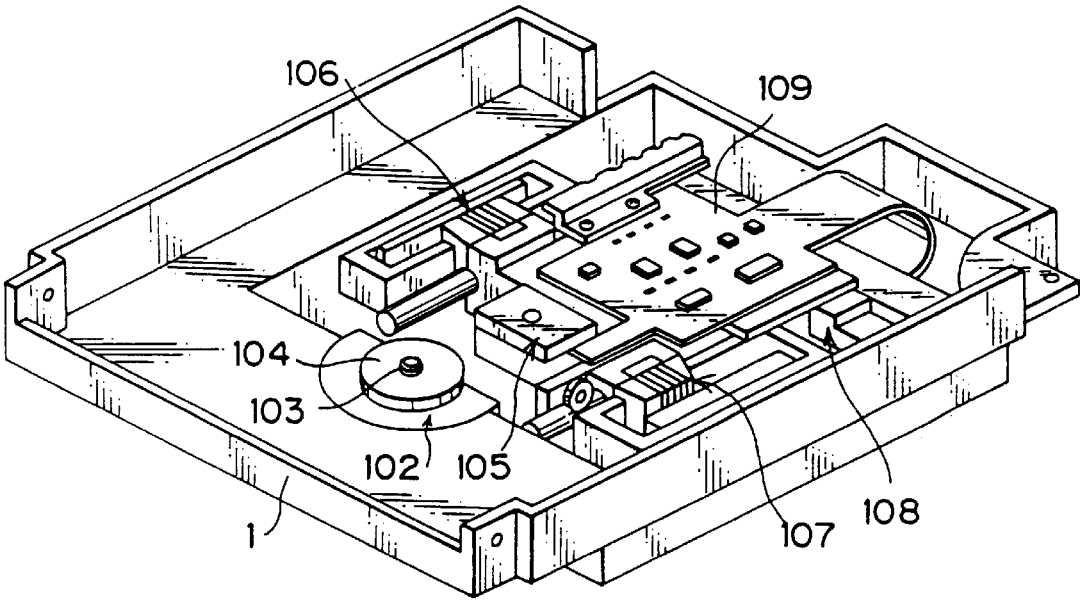
FIG. 9 is a perspective view of an example of the access mechanism housed in the chassis in accordance with the present invention.

FIG. 9 illustrates an access mechanism for read/write data on and from the magneto-optic disk assembled in the chassis 1. The mechanism arranged in the chassis 1 comprises a spindle motor 102 for driving the magneto-optic disk to rotate, a turn table 104 installed on the shaft 103 of the motor 102 for mounting the disk thereon, an optical pickup device 105, seek motors 106 and 107 for driving the optical pickup device to move and a linear encoder 108 for detecting the schematic position of the optical pickup.

Figure 10:
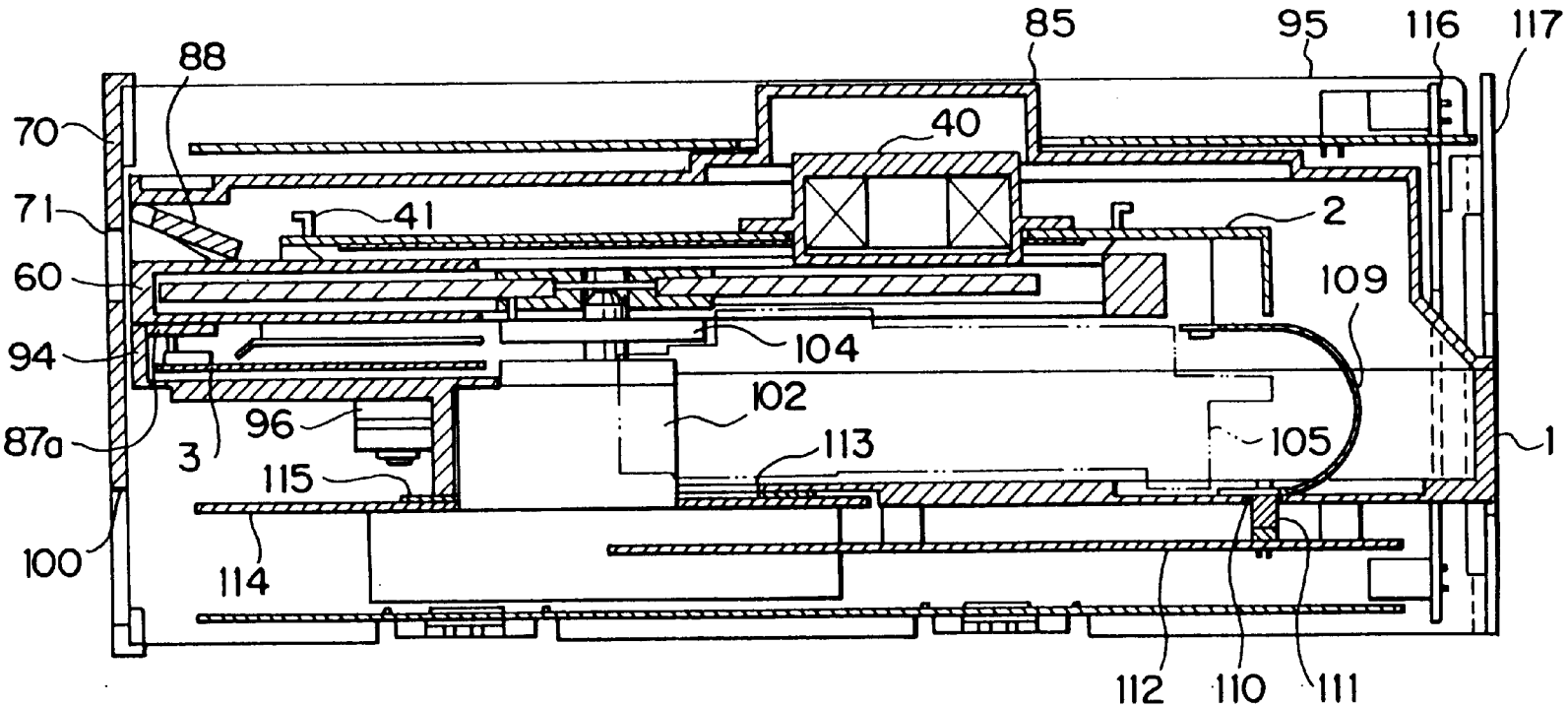
FIG. 10 is a sectional view of the optical disk drive unit in a state wherein the disk cartridge is sealingly enclosed therein.

A flexible printed wiring board 109 is disposed on the optical pick up device. Necessary circuits for driving the optical pickup 105, seek motors 106 and 107 and the linear encoder 108 are arranged on the printed wiring board 109. The wirings of the flexible printed wiring board 109 are connected to pins of a connector 111 which projects into the chassis 1 from underside thereof through a hole 110 formed in the bottom plate of the chassis 1, as illustrated in FIG. 10.

The connector 111 is connected to a control board 112 disposed under the chassis 1. Also, the hole 110 is covered and closed by the flexible printed wiring board 109 so that sealing tightness of the hole 109 is raised.

The drive circuit and control circuit for the motors disposed in the chassis 1 are mounted on a wiring board 116 disposed in a space between the rear end of the chassis 1 and the rear end of the frame 95. To this circuit board 116 is connected a heat radiation plate 117 attached to the rear end of the frame 95 so as to radiate the heat generated from the parts mounted on the board 116.

Also, in a state wherein the disk cartridge 55 is installed in the unit, the under surface of the trailing end of the disk cartridge 55 comes in slight contact with the upper surface of the front wall 94 of the chassis 1. In this state, the disk cartridge 55 comes in contact with the lower member 87a of the inlet 87 formed in the chassis cover 85 so that the lower part of the cartridge is sealed. Also, the lower edge of the lid 88 comes in contact with the upper surface of the disk cartridge 55 so that the upper part of the cartridge is sealed. Further, both sides of the disk cartridge 55 come in contact with the inner side wall of the inlet 87 so that the both side parts of the cartridge are sealed.

As mentioned above, even in the case where the disk cartridge 55 is inserted in the unit, the sealing tightness between the cartridge 55 and the chassis 1 is reliably maintained so that the outer air is almost prevented from entering into the chassis 1 through the gap between the chassis 1 and the cartridge 55.

Besides, the impact force which acts upon the chassis 1 is absorbed by the vibroisolating rubbers 96, 97, 98 and 99, which keeps the gap between the chassis 1 and the members surrounding the chassis closed so that the sealing tightness of the chassis is maintained being unchanged even when an impact force acts upon the chassis.

In accordance with the above mentioned arrangement of the enclosure for disk cartridge, the access mechanism housed in the chassis 1 is always sealingly enclosed in the chassis and discommunicated from the outside of the chassis. Therefore, even in the event where the cooling air is ventilated into the frame 95, the outer air is essentially prevented from entering into the access mechanism as a result of which it becomes possible to avoid the event that dusts included in the air stick to the optical parts of the pickup device.

Further, the heat generating sources such as the drive circuit and the control circuit for the access mechanism are assembled on the circuit board 116 disposed at the rear end portion of the frame 95 so that the heat is prevented from being accumulated in the chassis 1 to a certain degrees. Also, the heat from inside of the chassis 1 is radiated to outside of the chassis 1 through the outer surface of the chassis 1 and the its cover 85, which makes it possible to keep the temperature in the chassis 1 within an allowance range for the access mechanism and the magneto-optic disk.

it is to be noted that by constituting the chassis 1 from die casting material, it becomes possible to raise the accuracy of size of each part of the chassis, which further enables to raise the sealing tightness of the chassis 1.

It is also to be noted that by constituting the chassis cover 85 from plastic material, it becomes possible to easily realize a complicated shape, which makes it possible to obtain a high sealing tightness without using a special sealing member. Also, the chassis cover 85 is easily attached to the chassis 1 as well and the lid 88 is also easily attached to the chassis cover 85.

Figure 11:
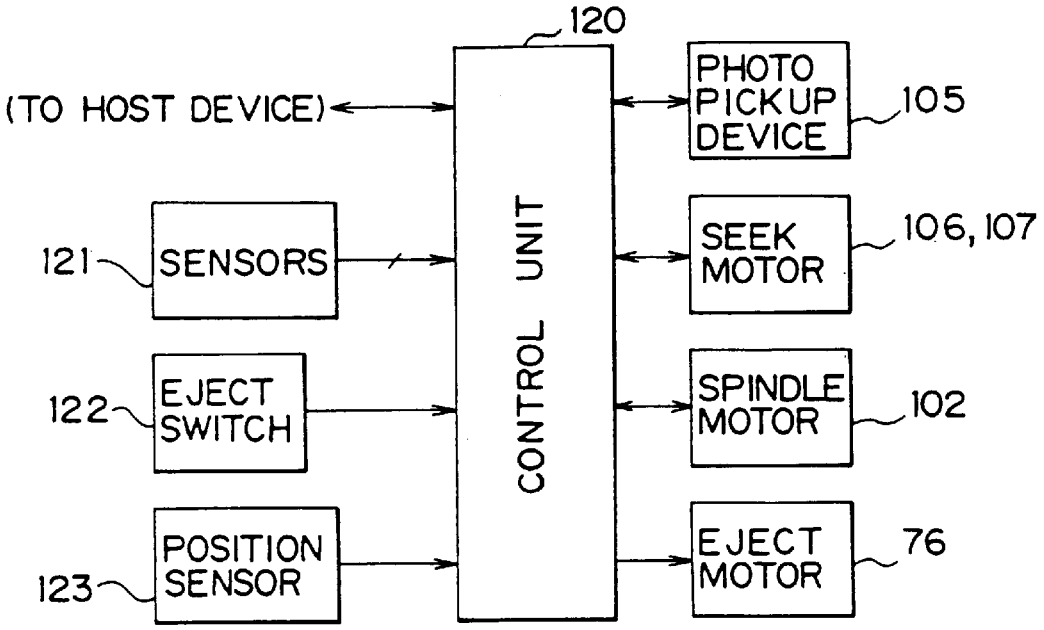
FIG. 11 is a block diagram of the control system applied to the magneto-optic disk device in accordance with the present invention.

FIG. 11 illustrates an example of the block diagram of the control system for the disk drive unit in accordance with the present invention.

In the drawing is represented a control unit 120 which transmits and exchanges various data between the host device so as to control the function of the magneto-optic disk device. The control unit 120 also controls the functions of the eject motor 6, the spindle motor 102, the photo pickup device 105 and the seek motors 106 and 107.

Numeral 121 designates a group of sensors such as a write protect sensor 48, and media mark sensors 45, 46 and 47. The detected signals output from the sensors 121 are transmitted to the control unit 120. The on/of signal output from the eject switch 122 operated in cooperation with the eject button 101 is also transmitted to the control unit 120. Further, The detection signal output from the position sensor 123 which detects one turn of the cam 80 is also transmitted to the control unit 120.

Figure 12:
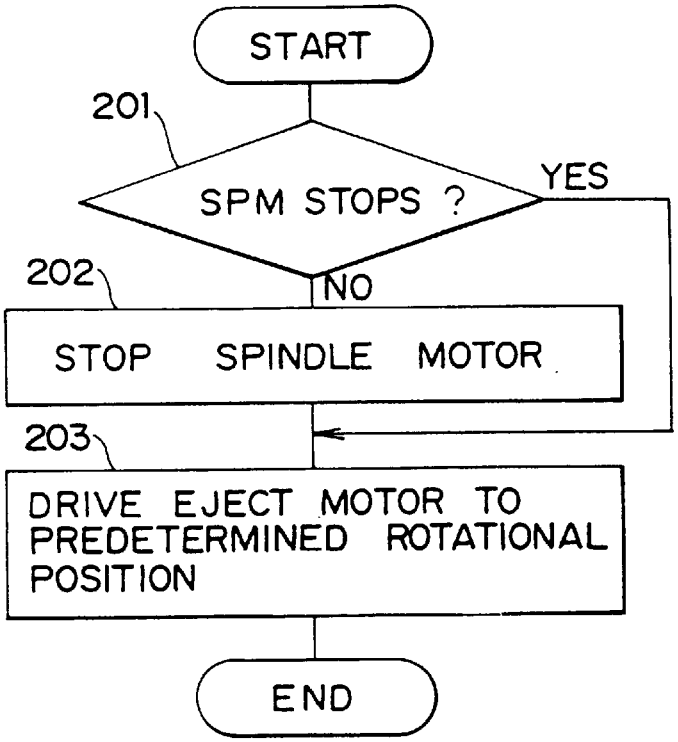
FIG. 12 is a flow chart of an example of the process of the ejecting function in accordance with the present invention.

FIG. 12 illustrates a flow chart of the sequence executed by the control unit 120 at the time when the eject switch 122 is turned on by pressing the eject button 101.

First, whether the spindle motor 102 is stopped or not is checked in step 201. If the check result is NO, the spindle motor 102 is deenergized to stop (step 202).

When the motor 102 is stopped in such a way, the eject motor 76 is driven to rotate until the position sensor 123 outputs the detection signal (step 203).

Figure 13A:
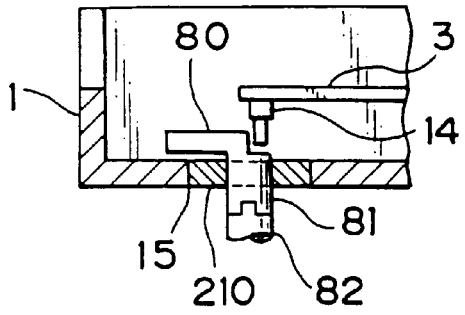
FIG. 13a is a partial sectional view of another example of the sealing structure for the eject mechanism in accordance with the present invention.
Figure 13B:
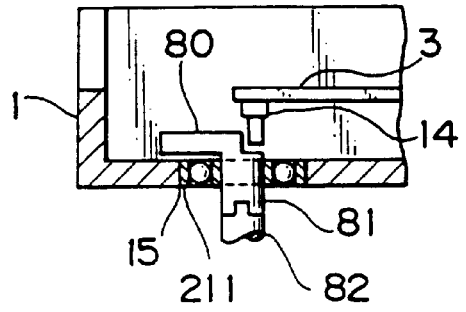
FIG. 13b is a partial sectional view of still another example of the sealing structure for the eject mechanism in accordance with the present invention.

It is to be noted that, in accordance with the sealing arrangement of the embodiment mentioned above, the gap between the shaft (engagement member) 81 of the cam 80 and the inside wall of the hole 15 formed in the chassis 1 is not completely sealed. However, instead of such an arrangement, to achieve a complete sealing at this portion, it may be possible to arrange an oilless type metal bearing 210 for the shaft 81 which bearing fits into the hole 15, as illustrated in FIG. 13a. Or otherwise, it also may possible to arrange a sealing type ball bearing 211 for the shaft 81 which bearing fits into the hole 15, as illustrated in FIG. 13b.

Figure 13C:
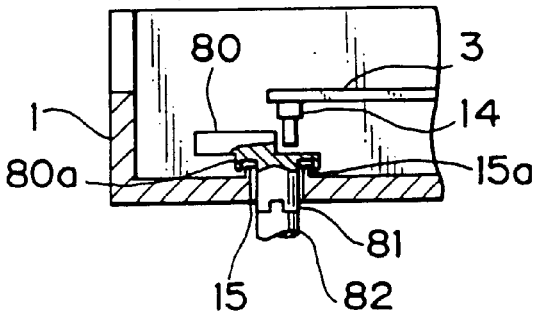
FIG. 13c is a partial sectional view of a further example of the sealing structure for the eject mechanism in accordance with the present invention.

Further, instead of those arrangements mentioned above, it also may possible to arrange the sealing structure in such a way that a wall 15a is formed on the chassis floor member surrounding the hole 15 and that a sealing wall 80a is formed hanging from the cam 80 and covering the wall 15a from outer side thereof, as illustrated in FIG. 13c. In accordance with this arrangement, the gap between the wall 15a and the sealing member 80 is cranked and constitutes a labyrinth seal structure so that it becomes possible to almost completely prevent the entrance of the outer air through the gap into the chassis.

It is to be noted that in accordance with the embodiment mentioned above, the invention is applied to a magneto-optic disk drive unit. However, the present invention can be applied to an optical disk drive unit as well.

It is also to be noted that in accordance with the embodiment mentioned above, the cartridge insertion inlet portion of the chassis cover is formed in such a shape that the inlet member surrounds the entire surface of the disk cartridge to be inserted. However, the lower side member of the inlet can be deleted without impairing the effect of the present invention.

As mentioned above, in accordance with the present invention, the drive means for driving the eject pin is disposed outside of the sealing enclosure unit housing the disk drive arrangement, which makes it possible to effectively prevent the entrance of the dusts or other minute particles generated from the driving mechanism into the enclosure unit. Also, in accordance with the present invention, the arrangement is made to close the gap between the inner side wall of the hole formed in the chassis and the linkage member which is disposed between the cam and the cam drive means and penetrates through the hole to interconnect the cam and the drive means together, which makes it possible to reliably prevent the entrance of dusts or other particles into the drive unit enclosure through the gap.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical disk drive unit for loading a disk cartridge which houses a disk-shaped recording medium at a predetermined position in the unit and ejecting the loaded disk cartridge from the unit as well, said optical disk drive unit comprising:

a sealing enclosure which sealingly encloses said recording medium and an access mechanism for writing/reading data on and from said recording medium from exterior in a state where said disk cartridge is installed in the unit;

an input means for inputting a command signal to eject said loaded disk cartridge from the unit;

an eject means for ejecting said disk cartridge from the unit;

a pin for moving and arranging said eject means to a state for starting its ejecting function;

a cam member which is arranged in such a way that said cam member is disengaged from said pin when said disk cartridge is being unloaded from the unit and that said cam member contacts said pin to start said ejecting function by said eject means when said disk cartridge is being loaded in the unit so that by rotating said cam member, said ejecting function can be conducted;

a cam drive means for driving said cam member to rotate which drive means is disposed outside of said sealing enclosure;

a linkage means for connecting a rotational shaft of said cam drive means to said cam member which linkage means is disposed penetrating through a hole formed in said sealing enclosure; and a control means for controlling said cam member in such a way that upon receipt of said command signal to eject said disk cartridge transmitted from said input means, said cam drive means is driven to rotate said cam member until said disk cartridge is ejected;

wherein a sealing type bearing means is disposed between said linkage means and said hole through which said linkage means penetrates said enclosure from outside to inside thereof.

2. An optical disk drive unit according to claim 1, wherein a wall member is disposed surrounding said hole and wherein an enclosing member which covers said wall member from outer side thereof is disposed on said cam member.

3. An optical disk drive unit according to claim 2, wherein a labyrinth seal structure is constituted from said wall member and said enclosing member surrounding said wall member.

4. An optical disk drive unit according to claim 1, wherein said sealing enclosure is composed of a chassis constituting a lower part of said enclosure and a chassis cover constituting an upper part of said enclosure, and wherein each of the side plates of said chassis has a projecting step formed on its upper surface which mates with a recessed step formed on the lower surface of each side plate of said chassis cover so that said chassis and cover are combined together through said projecting steps mating together along said edges thereof.

5. An optical disk drive unit according to claim 4, wherein said chassis has a hole, wherein a cam member is disposed above said hole within said chassis, and wherein a linkage member which constitutes a rotational shaft of said cam member is connected to an eject motor disposed outside of said chassis through said hole.

6. An optical disk drive unit according to claim 5, wherein said linkage member engages with a male engagement member having at least two notches different from each other in width, and wherein said male engagement member transmits a rotational force to said linkage member.

7. An optical disk drive unit according to claim 5, wherein said cam member has an outer configuration such that an increasing ratio of a radius of a basic circle of said cam member to a rotational angle of said cam member is not constant.

8. An optical disk drive unit according to claim 4, wherein said chassis cover has a disk cartridge insertion inlet formed in the front side thereof, said inlet being covered by an urged lid which is biased to close the opening of the inlet and rotatable to open and close the inlet, and which has a lower edge which comes in contact with an upper surface of the cartridge when the disk cartridge is inserted into said enclosure through said inlet.

9. An optical disk drive unit for loading a disk cartridge which houses a disk-shaped recording medium at a predetermined position in the unit and ejecting the loaded disk cartridge from the unit as well, said optical disk drive unit comprising:

a sealing enclosure which sealingly encloses said recording medium and an access mechanism for writing/reading data on and from said recording medium from exterior in a state where said disk cartridge is installed in the unit, wherein said sealing enclosure is composed of a chassis constituting a lower part of said enclosure and a chassis cover constituting an upper part of said enclosure, and wherein each of the side plates of said chassis has a projecting step formed on its upper surface which mates with a recessed step formed on the lower surface of each side plate of said chassis cover so that said chassis and cover are combined together through said projecting steps mating together through said projecting steps mating together along said edges thereof;

an input means for inputting a command signal to eject said loaded disk cartridge from the unit;

an eject means for ejecting said disk cartridge from the unit;

a pin for moving and arranging said eject means to a state for starting its ejecting function;

a cam member which is arranged in such a way that said cam member is disengaged from said pin when said disk cartridge is unloaded from the unit and that said cam member contacts said pin to start said ejecting function by said eject means when said disk cartridge is loaded in the unit so that by rotating said cam member, said ejecting function can be conducted;

a cam drive means for driving said cam member to rotate which drive means is disposed outside of said sealing enclosure;

a linkage means for connecting a rotational shaft of said cam drive means to said cam member which linkage means is disposed penetrating through a hole formed in said sealing enclosure for transmitting a driving force from the cam drive means to the cam member by rotation thereof;

a sealing type bearing means is disposed between said linkage means and said hole; and a control means for controlling said cam member in such a way that upon receipt of said command signal to eject said disk cartridge which houses a disk-shaped recording medium at a predetermined transmitted from said input means, said cam drive means is driven to rotate said cam member until said disk cartridge is ejected.

10. An optical disk drive unit for loading a disk cartridge which houses a disk-shaped recording medium at a predetermined position in the unit and ejecting the loaded disk cartridge from the unit as well, said optical disk drive unit comprising:

a sealing enclosure which sealingly encloses said recording medium and an access mechanism for writing/reading data on and from said recording medium from exterior in a state where said disk cartridge is installed in the unit;

an input means for inputting a command signal to eject said loaded disk cartridge from the unit;

an eject means for ejecting said disk cartridge from the unit;

a pin for moving and arranging said eject means to a state for starting its ejecting function;

a cam member which is arranged in such a way that said cam member is disengaged from said pin when said disk cartridge is unloaded from the unit end that said cam member is contacted by said pin to start said ejecting function by said eject means when said disk cartridge is loaded in the unit so that by rotating said cam member said ejecting function can be conducted;

a cam drive means for driving said cam member to rotate which drive means is disposed outside of said sealing enclosure;

a linkage means for connecting a rotational shaft of said cam drive means to said cam member which linkage means is disposed penetrating through a hole formed in said sealing enclosure; and a sealing type bearing means is disposed between said linkage means and said hole;

a wall member is disposed surrounding said hole and wherein an enclosing member which covers said wall member from an outer side thereof is disposed on said cam member;

a labyrinth seal structure is constituted from said wall member and said enclosing member surrounding said wall member; and a control means for controlling said cam member in such a way that upon receipt of said command signal to eject said disk cartridge transmitted from said input means, said cam drive means is driven to rotate said cam member until said disk cartridge is ejected.

11. An optical disk drive unit according to claim 10, wherein said sealing enclosure is composed of a chassis constituting a lower part of said enclosure and a chassis cover constituting an upper part of said enclosure, and wherein each of the side plates of said chassis has a projecting step formed on its upper surface which mates with a recessed step formed on the lower surface of each side plate of said chassis cover so that said chassis and cover are combined together through said projecting steps mating together along said edges thereof;

said chassis has a hole, said cam member is disposed above said hole within said chassis, and said linkage means which constitutes a rotational shaft of said cam member is connected to an eject motor disposed outside of said chassis through said hole;

said chassis cover has a disk cartridge insertion inlet formed in the front side thereof, said inlet being covered by an urged lid which is biased to close the opening of the inlet and ratable to open and close the inlet, and has a lower edge which comes in contact with an upper surface of the cartridge when the disk cartridge is inserted into said enclosure through said inlet;

said linkage member engages with a male engagement member having at least two notches different from each other in width, said male engagement member transmitting a rotational force to said linkage member; and said cam member has such an outer configuration that an increasing ratio of a radius of a basic circle of said cam member to a rotational angle of said member is not constant.

*12. An optical disk drive unit for loading a disk cartridge which houses a disk-shaped recording medium at a predetermined position in the unit and ejecting the loaded disk cartridge from the unit as well, said optical disk drive unit comprising:*

*a sealing enclosure which sealingly encloses said recording medium and an access mechanism for writing/reading data on and from said recording medium from exterior in a state where said disk cartridge is installed in the unit;*

*an input means for inputting a command signal to eject said loaded disk cartridge from the unit;*

*an eject means for ejecting said disk cartridge from the unit;*

*a pin for moving and arranging said eject means to a state for starting its ejecting function;*

*a cam member, provided within the sealing enclosure and which is arranged in such a way that said cam member is disengaged from said pin when said disk cartridge is unloaded from the unit and that said cam member contacts said pin to start said ejecting function by said eject means when said disk cartridge is loaded in the unit so that by rotating said cam member, said ejecting function can be conducted;*

*a cam drive means for generating a rotational driving force, said cam drive means being disposed outside of said sealing enclosure;*

*a linkage means for connecting a rotational shaft of said cam drive means to said cam member, said linkage means being disposed rotatably so as to penetrate through a hole formed in said sealing enclosure for transmitting the rotational driving force of said cam drive means to said cam member, said hole having a diameter substantially equal to that of said linkage means, said hole and said linkage means substantially forming a portion of said sealing enclosure; and*

*a control means for controlling said cam member in such a way that upon receipt of said command signal to eject said disk cartridge transmitted from said input means, said cam drive means is driven to rotate said cam member until said disk cartridge is ejected.*

*13. An optical disk drive unit according to claim 12, wherein a sealing means is disposed between said linkage means and said hole through which said linkage means penetrates said sealing enclosure from outside to inside thereof.*

*14. An optical disk drive unit according to claim 12, wherein a sealing type bearing means is disposed between said linkage means and said hole through which said linkage means penetrates said sealing enclosure from outside to inside thereof.*

*15. An optical disk drive unit according to claim 12, wherein a wall member is disposed surrounding said hole and wherein an enclosing member which covers said wall member from an outer side thereof is disposed on said cam member.*

*16. An optical disk drive unit according to claim 15, wherein a labyrinth seal structure is constituted from said wall member and said enclosing member surrounding said wall member.*

*17. An optical disk drive unit according to claim 12, wherein said sealing enclosure is composed of a chassis constituting a lower part of said sealing enclosure and a chassis cover constituting an upper part of said sealing enclosure, and wherein each of the side plates of said chassis has a projecting step formed on its upper surface which mates with a recessed step formed on the lower surface of each side plate of said chassis cover so that said chassis and said chassis cover are combined together through said projecting steps mating together along said edges thereof.*

*18. An optical disk drive unit according to claim 17, wherein said chassis has a hole, wherein a cam member is disposed above said hole within said chassis, and wherein a linkage member which constitutes a rotational shaft of said cam member is connected to an eject motor disposed outside of said chassis through said hole.*

*19. An optical disk drive unit according to claim 18, wherein said linkage member engages with a male engagement member having at least two notches different from each other in width, and wherein said male engagement member transmits a rotational force to said linkage member.*

*20. An optical disk drive unit according to claim 18, wherein said cam member has an outer configuration such that an increasing ratio of a radius of a basic circle of said cam member to a rotational angle of said cam member is not constant.*

*21. An optical disk drive unit according to claim 17, wherein said chassis cover has a disk cartridge insertion inlet formed in the front side thereof, said inlet being covered by an urged lid which is biased to close the opening of the inlet and rotatable to open and close the inlet, and which has a lower edge which comes in contact with an upper surface of the cartridge when the disk cartridge is inserted into said sealing enclosure through said inlet.*

* * * * *